US009395788B2

(12) United States Patent
Knight et al.

(10) Patent No.: US 9,395,788 B2
(45) Date of Patent: Jul. 19, 2016

(54) POWER STATE TRANSITION ANALYSIS

(71) Applicant: Intel Corporation, Santa Clara, CA (US)

(72) Inventors: Robert P. Knight, Mahomet, IL (US); Gautam Upadhyaya, Champaign, IL (US); Min Yeol Lim, Champaign, IL (US); Neha Sharma, Urbana, IL (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 14/228,784

(22) Filed: Mar. 28, 2014

(65) Prior Publication Data

US 2015/0277528 A1 Oct. 1, 2015

(51) Int. Cl.
*G06F 1/26* (2006.01)
*G06F 1/32* (2006.01)

(52) U.S. Cl.
CPC ............ *G06F 1/3206* (2013.01); *G06F 1/3243* (2013.01); *G06F 1/3293* (2013.01)

(58) Field of Classification Search
CPC ....................................................... G06F 1/3203
USPC ................................................. 713/300, 320
See application file for complete search history.

(56) References Cited

U.S. PATENT DOCUMENTS

| 6,792,392 B1 | 9/2004 | Knight |
| 7,644,293 B2 | 1/2010 | Sistla et al. |
| 7,903,116 B1 | 3/2011 | Klock et al. |
| 8,024,590 B2 * | 9/2011 | Song ..................... G06F 1/3203 713/321 |
| 8,190,939 B2 * | 5/2012 | Fields, Jr. ............. G06F 1/3203 713/320 |
| 8,700,943 B2 | 4/2014 | Dixon et al. |
| 2007/0033425 A1 | 2/2007 | Clark |
| 2007/0079294 A1 | 4/2007 | Knight et al. |
| 2007/0214342 A1 | 9/2007 | Newburn |
| 2008/0104425 A1 | 5/2008 | Gunther et al. |
| 2008/0162972 A1 | 7/2008 | Liu et al. |
| 2009/0150695 A1 | 6/2009 | Song et al. |
| 2009/0172375 A1 | 7/2009 | Rotem et al. |
| 2010/0031075 A1 | 2/2010 | Kapil |
| 2011/0010566 A1 * | 1/2011 | Bandholz ............. G06F 1/3203 713/300 |
| 2011/0087900 A1 | 4/2011 | Lakhanpal et al. |
| 2011/0106282 A1 | 5/2011 | Craig et al. |

(Continued)

OTHER PUBLICATIONS

"Linux Cross Reference" Embedded Linus Experts, available at http://lxr.free-electrons.com/source/drivers/idle/intel_idle.c, printed May 2, 2014, 11 pages.

(Continued)

*Primary Examiner* — Mark Connolly
(74) *Attorney, Agent, or Firm* — Barnes & Thornburg LLP

(57) ABSTRACT

Technologies for analyzing power state transitions of a processor of computing device including determining, by the computing device, a power state entered by the processor of the computing device and a duration of the power state entered based on power state records, wherein the power state records comprise transition data indicative of transitions of a processor of the computing device between power states. The computing device further determines an accuracy of a power state selection of the processor of the computing device based on the determined power state entered and target residency data for the processor. The target residency data identifies, for each power state of a plurality of power states of the processor, an amount of time required in the corresponding power state to result in a conservation of power.

22 Claims, 5 Drawing Sheets

(56) References Cited

U.S. PATENT DOCUMENTS

| | | | |
|---|---|---|---|
| 2012/0242671 A1* | 9/2012 | Wyatt | G09G 5/001 345/520 |
| 2012/0246506 A1 | 9/2012 | Knight | |
| 2012/0311361 A1* | 12/2012 | Locker | G06F 1/3234 713/323 |
| 2013/0290758 A1* | 10/2013 | Quick | G06F 1/3203 713/323 |
| 2014/0181553 A1* | 6/2014 | Eckert | G06F 1/3234 713/323 |
| 2014/0289546 A1* | 9/2014 | Min | G06F 1/3228 713/323 |
| 2015/0067357 A1* | 3/2015 | Arora | G06F 1/26 713/300 |
| 2015/0198991 A1* | 7/2015 | Bircher | G06F 1/3234 713/323 |

OTHER PUBLICATIONS

SunSoft, x86 Assembly Language Reference Manual, 1995, Sun Microsystems, 204 pages.

International Searching Authority, "Notification of Transmittal of the International Search Report and the Written Opinion of the International Search Authority," mailed Dec. 10, 2012, in International Application No. PCT/US2011/068006, 3 pages.

* cited by examiner

POWER STATE TRANSITION ANALYSIS

BACKGROUND

Modern computing devices such as laptops, networks, desktops, and servers include processors and other hardware components that process data and perform a variety of tasks during the operation of the computing device. However, at any given time during operation of the computing device, one or more of the hardware components may not be in use. Rather than supplying full power to an unused hardware component, the component may be placed into a low-power state to reduce the amount of power consumed by the component when not in use. Thereafter, the computing device may "wake" the hardware component from the low-power state to perform some task.

The processors of such computing devices typically support multiple different low-power states. For example, a processor may have a full-power state in which the processor is actively executing instructions. Upon executing the instructions, the processor may transition to one of the multiple low-power states depending on, for example, the current load on the computing device. Although a "deeper" low-power state saves more power than a "shallow" low-power state, the transitions between a deeper low-power state and the full-power state involve greater latency and power consumption to execute the power state transition. Accordingly, the processor and/or the operation system of the computing device balances various factors in determining which low-power state in which to place an inactive processor.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
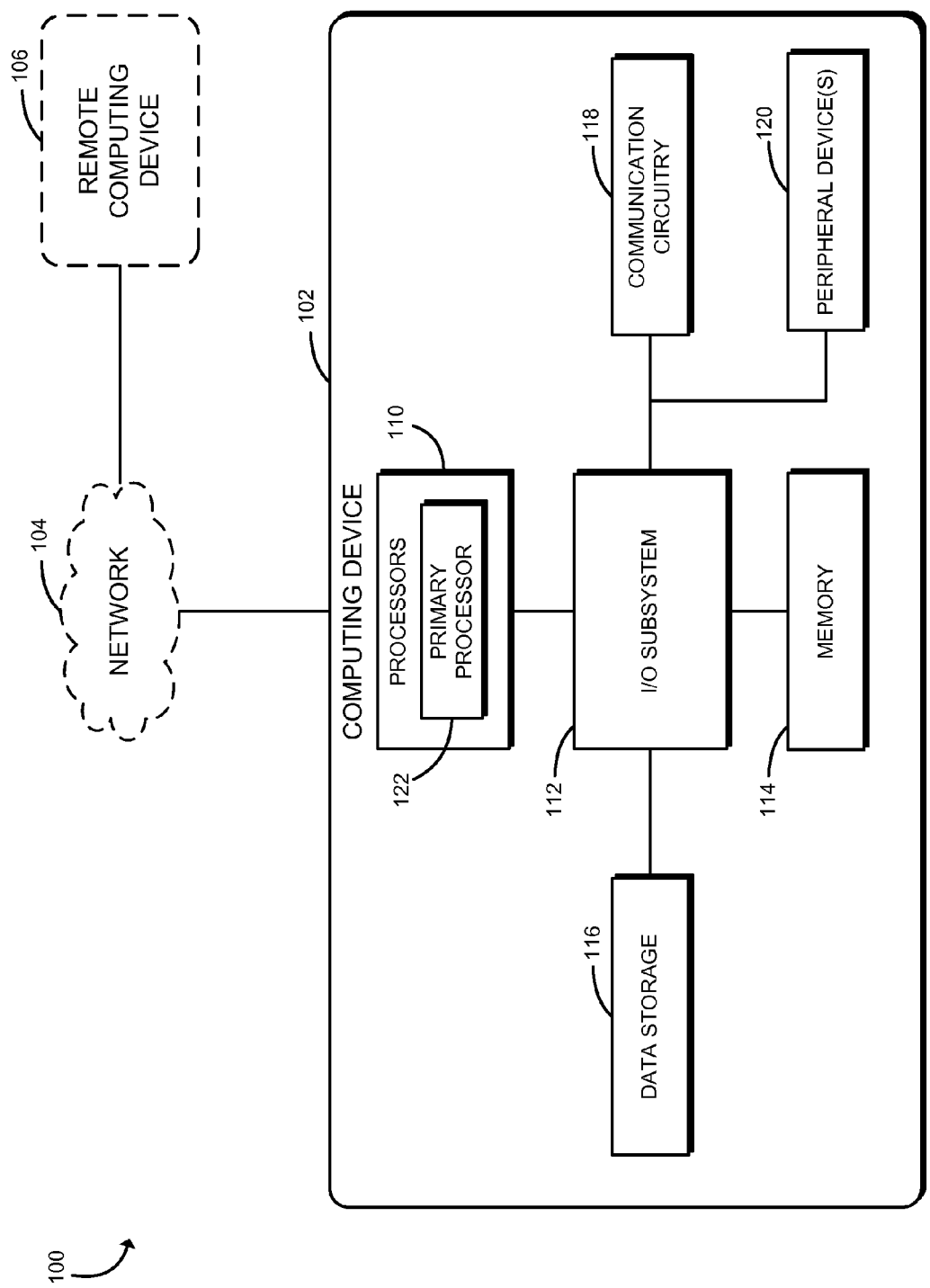
FIG. 1 is a simplified block diagram of at least one embodiment of a system for analyzing power state transitions of a processor of a computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for collecting and analyzing power state data indicative of power state transitions by a computing device 102 is shown. As described herein, the computing device 102 is configured to both collect and analyze the power state data. However, in other embodiments, the system 100 may include a network 104 and a remote computing device 106, which enable the computing device 102 to transmit collected power state data to the remote computing device 106 for remote analysis. Each of the computing device 102 and the remote computing device 106 may be embodied as any type of computing device capable of performing the functions described herein. For example, each of the computing device 102 and the remote computing device 106 may be embodied as a desktop computer, server, laptop computer, tablet computer, notebook, netbook, ultrabook™, cellular phone, smartphone, wearable computing device, personal digital assistant, mobile Internet device, Hybrid device, and/or any other computing/communication device. It should be appreciated that, in some embodiments, the computing device 102 and the remote computing device 106 may include similar features and/or components.

As indicated above, in some embodiments, the computing device 102 may communicate with the remote computing device 106 over a network 104 to offload the analysis of the power state data. It should be appreciated that the network 104 may be embodied as any number of various wired and/or wireless telecommunication networks. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof.

As shown in FIG. 1, the illustrative computing device 102 includes one or more processors 110, an input/output ("I/O") subsystem 112, a memory 114, a data storage 116, a communication circuitry 118, and one or more peripheral devices 120. Of course, the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

Each of the one or more processors 110 may be embodied as any type of processor capable of performing the functions described herein. For example, each of the processors 110 may be embodied as a single or multi-core processor(s), central processing unit, co-processor (e.g., a security co-processor, audio co-processor, etc.), digital signal processor, microcontroller, graphics processor, manageability engine, low-power processor, or other processor or processing/controlling circuit. Further, as shown in FIG. 1, the one or more processors 110 include a primary processor 122 (e.g., a main processor or a central processor unit). Of course, it should be appreciated that, in some embodiments, the computing device 102 may include one or more other processors that may not perform or may not be configured to perform the functions described herein with regard to the processors 110.

Each of the processors 110 may operate in a plurality of power states (e.g., a full power state and one or more low-power states). For example, a processor 110 may be based on an Intel instruction set architecture (ISA) and/or may be able to operate in a number of power states (e.g., "C-states") in accordance with an Advanced Configuration and Power Interface (ACPI) standard such as, for example, Rev. 5.0 (published Dec. 6, 2011). In an embodiment, the processor 110 may be configured to operate in a full power state (C0) and a number of low-power states (C1-CN), where C1 is the "shallowest" low-power state, CN is the "deepest" low-power state, and N is the total number of low-power states available to the processor 110. In such an embodiment, the processor 110 consumes less power when operating in the C1 state than when operating in the C0 state but more power than when operating in the C2 state. Similarly, the processor 110 consumes less power when operating in the C2 state than when operating in the C1 state but more power than when operating in the C3 state, and so on.

Of course, it should be appreciated that the processors 110 may include different sets of power states between which the processors 110 may transition. For example, one processor 110 may include a full power state and six low-power states, whereas another processor 110 may include a full power state and ten low-power states. Further, the low-power states may have different characteristics depending on the particular processor 110 (e.g., power levels, target residency values, etc.).

Depending on the particular embodiment, the operating system of the computing device 102 may include a number of software-defined power states, which may be mapped to the processor 110 power states or a subset thereof. Further, in some embodiments, one or more of the low-power states may not be requested by the operating system (e.g., in response to an indication that the processor 110 has finished processing a workload or is otherwise idle); instead, such low-power states may only be entered autonomously (e.g., in response to a direct command of the processor 110 itself). Additionally, in the illustrative embodiment, the processor 110 is capable of transitioning between the full power state (e.g., C0) and a low-power state, but is unable to transition between two low-power states (e.g., C1 and C2). However, in other embodiments, the processor 110 may be configured to transition between low-power states. For example, the processor 110 may be capable of transitioning between any two power states of the processor 110.

It should further be appreciated that entering and exiting a low-power state requires a certain amount of power (e.g., greater than the amount of power consumed by the processor 110 during operation in the low-power state and/or in the full-power state). Additionally, some latency occurs between transitions to and from the low-power state. For example, transitions between the full-power state (e.g., C0) and a deep low-power state (e.g., C6) may result in greater latency and/or power consumption than transitions between the full-power state and a shallow low-power state (e.g., C2). Accordingly, as discussed in greater detail below, the processor 110 must stay in a particular low-power state for at least a threshold duration (i.e., a target residency) in order to result in a conservation of power relative to an amount of power consumed had the processor 110 not transitioned to the low-power state (i.e., the processor 110 maintained operation in the full-power state). As such, it should be appreciated that it is possible for the processor 110 to consume more power from entering and exiting a low power state than would have been consumed had the processor 110 maintained operation in the full-power state (e.g., from entering a deep low-power state for a brief duration).

The memory 114 of the computing device 102 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the primary processor 122 via the I/O subsystem 112, which may be embodied as circuitry and/or components to facilitate input/output operations with the processors 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the primary processor 122, the memory 114, and/or other components of the computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store power state data 218, target residency data 220, and/or various other data useful during operation of the computing device 102 as discussed below in regard to FIG. 2.

The communication circuitry 118 may be embodied as any communication circuit, device, or collection thereof, capable of enabling communications between the computing device 102 and other remote devices over the network 104 (e.g., the remote computing device 106). The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the computing device 102.

Figure 2:
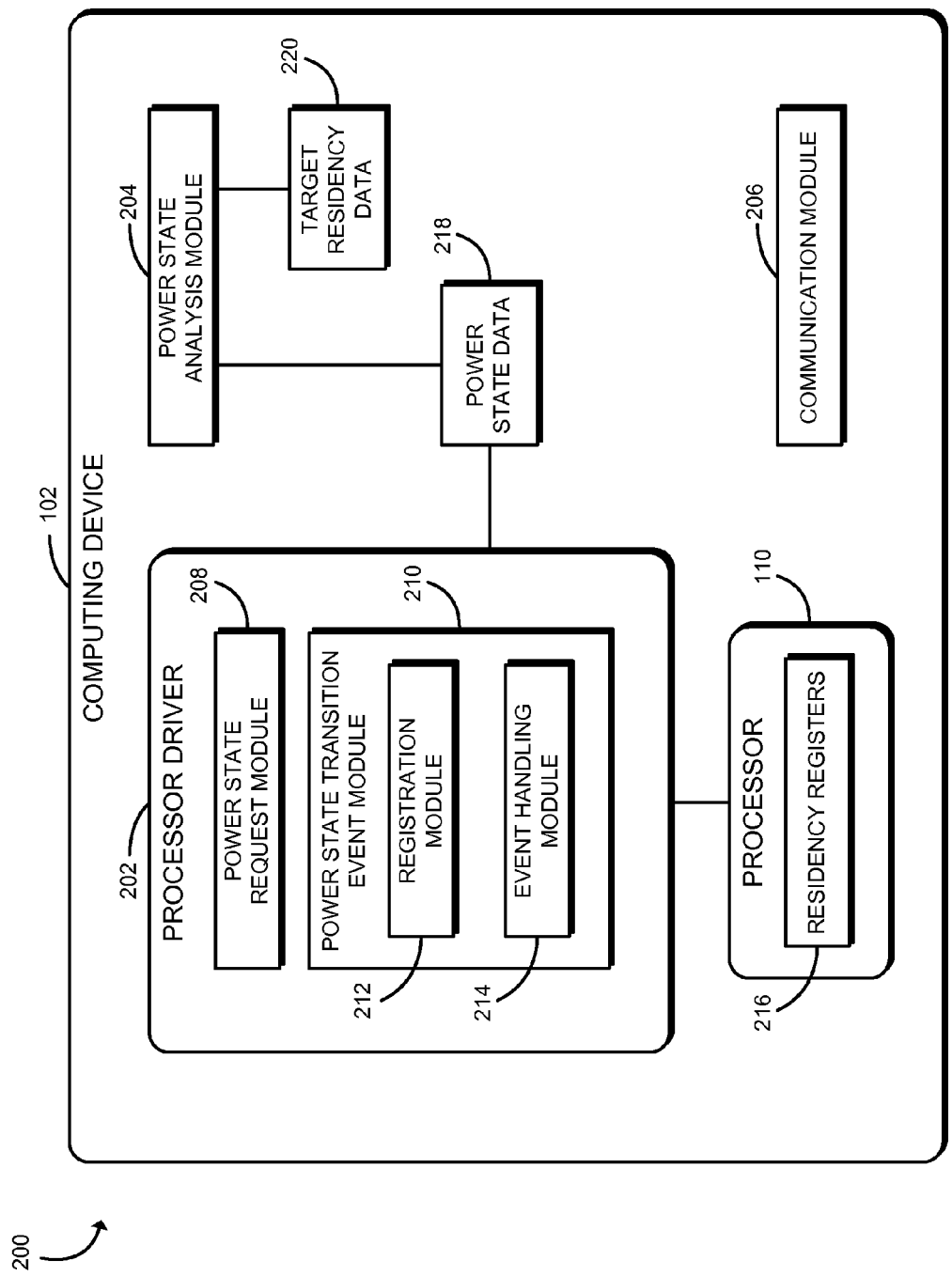
FIG. 2 is a simplified block diagram of at least one embodiment of an environment of the computing device of FIG. 1.

Referring now to FIG. 2, in use, the computing device 102 establishes an environment 200 for collecting and analyzing power state data. As discussed below, the computing device 102 determines, for each power state transition, a point in time at which a processor 110 of the computing device 102 transitions from a power state (e.g., a full power state) to a low-power state and a point in time at which the processor 110 transitions from the low-power state back to the full power state and stores that information as power state data (e.g., locally in the memory 114 or data storage 116 of the computing device 102 or remotely on another computing device). Based on the power state records, the computing device 102 or the remote computing device 106 determines (e.g., for each power state transition) a power state entered by the processor 110 and a duration spent in the power state entered (e.g., temporally, in terms of clock cycles, or according to another suitable scheme) and utilizes that information to determine whether the processor 110 entered an accurate low-power state based on target residency data for the processor 110.

The illustrative environment 200 of the computing device 102 includes a processor driver 202, a power state analysis module 204, and a communication module 206. Additionally, the processor driver 202 includes a power state request module 208 and a power state transition event module 210, which includes a registration module 212 and an event handling module 214. Each of the modules of the environment 200 may be embodied as hardware, software, firmware, or a combination thereof. Additionally, in some embodiments, one or more of the illustrative modules may form a portion of another module.

The processor driver 202 is embodied as a driver or other privilege-level module for a particular processor 110 of the one or more processors 110. In the illustrative embodiment, the processor driver 202 registers a power state transition event and tracks when the processor 110 changes its power state. In particular, the processor driver 202 reads residency registers 216 (e.g., model-specific registers) of the processor 110 to collect power state data 218 of the processor 110. To read the residency registers 216, the processor driver 202 may execute a privilege-level instruction such as, for example, an Intel ISA "rdmsr( )" instruction. As discussed above, the illustrative processor driver 202 includes the power state request module 208 and the power state transition event module 210.

The power state request module 208 may provide the processor 110 with a power state requested by an operating system of the computing device 102. That is, the operating system may request (e.g., upon notification that the processor 110 is idle) that the processor 110 enter a particular low-power state. It should be appreciated that the processor 110 may consider the operating system-requested power state and determine whether to, for example, enter into the requested low-power state, stay in a full power state, promote the power state request to a deeper low-power state, or demote the power state request to a shallower low-power state. Additionally, in some embodiments, the power state request module 208 may store data indicating the power state requested, if any, by the operating system (e.g., as power state data 218).

The power state transition event module 210 registers a power state transition event (e.g., a tracepoint) for the processor 110 and establishes an event handler for the power state transition. As discussed below, the event handler is then called in response to an occurrence of the power state transition event (e.g., an indication that the processor 110 is idle and/or preparing to enter a low-power state) and utilized to record power state data 218 based on data stored in the residency registers 216 of the processor 110. Of course, in some embodiments, separate event handlers may be utilized for a power state transition event associated with entry to a low-power state and for a power state transition event associated with exiting the low-power state (e.g., returning to the full-power state). Alternatively, the different types of power state transition events may be otherwise distinguished (e.g., with functional parameters).

In particular, the registration module 212 registers the power state transition event and establishes the event handler for the power state transition. For example, in embodiments in which a Linux operating system is employed, the registration module 212 may register a tracepoint handler, such as the event handling module 214. The registered power state transition event permits the processor driver 202 to be notified when the processor 110 enters or exits a power state. That is, an event handler (e.g., a callback function) is called upon the occurrence of a power state transition, which determines power state data 218 associated with the power state transition.

The event handling module 214 is configured to execute the instructions of the registered event handler in response to the occurrence of a registered power state transition event. As described herein, the event handling module 214 reads the residency registers 216 of the processor 110 (e.g., via execution of a privilege-level instruction) and stores those values as power state data 218 of the processor 110. Of course, in other embodiments, the event handling module 214 may store a modified version of the residency register 216 values (e.g., an integer representation). Further, in some embodiments, the event handling module 214 may utilize one or more processor buffers to save records associated with the residency registers 216.

In the illustrative embodiment, the processor 110 includes a separate residency register 216 for one or more of the power states (e.g., each power state, each low-power state, or another subset of the power states). For example, in an embodiment, a first low-power state (e.g., C1) may be associated with a first residency register 216, a second low-power state (e.g., C2) may be associated with a second residency register 216, a third low-power state (e.g., C3) may be associated with a third residency register 216, and so on. Additionally, in the illustrative embodiment, the residency registers 216 operate as counters, which may be utilized by the computing device 102 to determine the duration of the processor 110 in each of the power states. For example, a residency register 216 associated with a particular power state may be incremented for each clock cycle of the processor 110 spent in that power state. Of course, in other embodiments, the residency registers 216 may utilize additional and/or alternative mechanisms for determining the duration of the processor 110 spent in a particular power state (e.g., a timer, system clock, etc.).

The power state analysis module 204 determines a power state entered by the processor 110 and a duration of the power state entered based on the power state data 218. It should be appreciated that the power state analysis module 204 may make such a determination for each of one or more power state transitions of the processor 110 (e.g., within a specific period of time). As indicated above, in the illustrative embodiment, a residency register 216 associated with a particular power state is incremented for each clock cycle of the processor 110 spent in that power state.

Accordingly, if the processor 110 was operating in a particular low-power state for the duration defined between a point in time at which an power state entry transition event occurred and a power state exit transition event occurred, the values of the residency register 216 for that low-power state read and stored in response to the occurrence of those events would be different. Additionally, the difference between those values corresponds with a duration (e.g., number of clock cycles) spent in that low-power state. In embodiments in which the residency registers 216 are read at each power state transition of the processor 110, the difference between the values of the residency registers 216 associated with each of the other power states would be zero, because the processor 110 is only capable of operating in one power state at a given point in time. As such, the power state analysis module 204 may compare the power state data 218 stored based on the values of the residency registers 216 associated with a power state entry/exit sequence or pair to determine the particular low-power state entered and the duration of the processor 110 in that particular low-power state. In other embodiments, however, it should be appreciated that the processor 110 may make multiple transitions between power states between calls to the event handling module 214. For example, in an embodiment, the processor 110 may enter a shallow low-power state (e.g., C1) from a full-power state and, after a certain threshold has been reached (e.g., a period of time, number of clock cycles, etc.), the processor 110 may enter a deeper low-power state (e.g., C2) prior to returning to the full-power state. In such an embodiment, the power state analysis module 204 may similarly compare the power state data 218 stored based on the values of the residency registers 216 to determine the low-power states entered and the associated duration of the processor 110 in each of the low-power states entered.

The power state analysis module 204 further determines, for each of one or more power state transitions of the processor 110, the accuracy of the power state selection of the processor 110 based on the power state entered and target residency data 220 for the processor 110. The target residency data 220 identifies, for each power state of a plurality of power states of the processor 110, a duration (e.g., in terms of clock cycles or temporal duration) required in the corresponding power state to result in a conservation of power. As indicated above, the processor 110 must stay in a particular low-power state for at least a threshold duration (i.e., the target residency) in order to result in a conservation of power relative to maintaining full power. For example, in an embodiment, the processor 110 may have to stay in a first low-power state for at least six clock cycles, in a second low-power state for at least twenty clock cycles, in a third low-power state for at least eighty clock cycles, and in a fourth low-power state for at least eight hundred clock cycles in order to conserver power. In such an embodiment, the first low-power state can be said to have a target residency of six clock cycles, the second to have a target residency of twenty clock cycles, the third to have a target residency of eighty clock cycles, and the fourth to have a target residency of eight hundred clock cycles.

Additionally, in some embodiments, the power state analysis module 204 may further determine whether the duration in the power state entered exceeds a duration of time required in another power state (e.g., a deeper power state or shallower power state). Further, as indicated above, the processor 110 may override the request of the operating system to determine a more appropriate (i.e., in view of the processor 110) power state to which to transition. Accordingly, in some embodiments, the power state analysis module 204 may determine whether a power state requested by the operating system is consistent with the power state actually entered by the processor 110. Additionally, in some embodiments, the power state analysis module 204 may perform some action based on the determined accuracy of the power state selection by the processor 110. For example, the power state analysis module 204 may perform an analysis of the accuracy of power state selections over time, store data associated with the determined accuracy, perform a runtime modification of the operating system of the computing device 102 based on the determined accuracy of the power state selection, and/or perform some other suitable action The communication module 206 handles the communication between the computing device 102 and remote devices (e.g., the remote computing device 106) through the corresponding network (e.g., the network 104). For example, in some embodiments, the communication module 206 may transmit the power state data 218, target residency data 220, and/or other data to the remote computing device 106 for remote analysis and may also receive data from the remote computing device 106 or other computing devices (e.g., instructions to modify the operating system of the computing device 102 based on an analysis of the accuracy of the power state selections of the processor 110.

Figure 3:
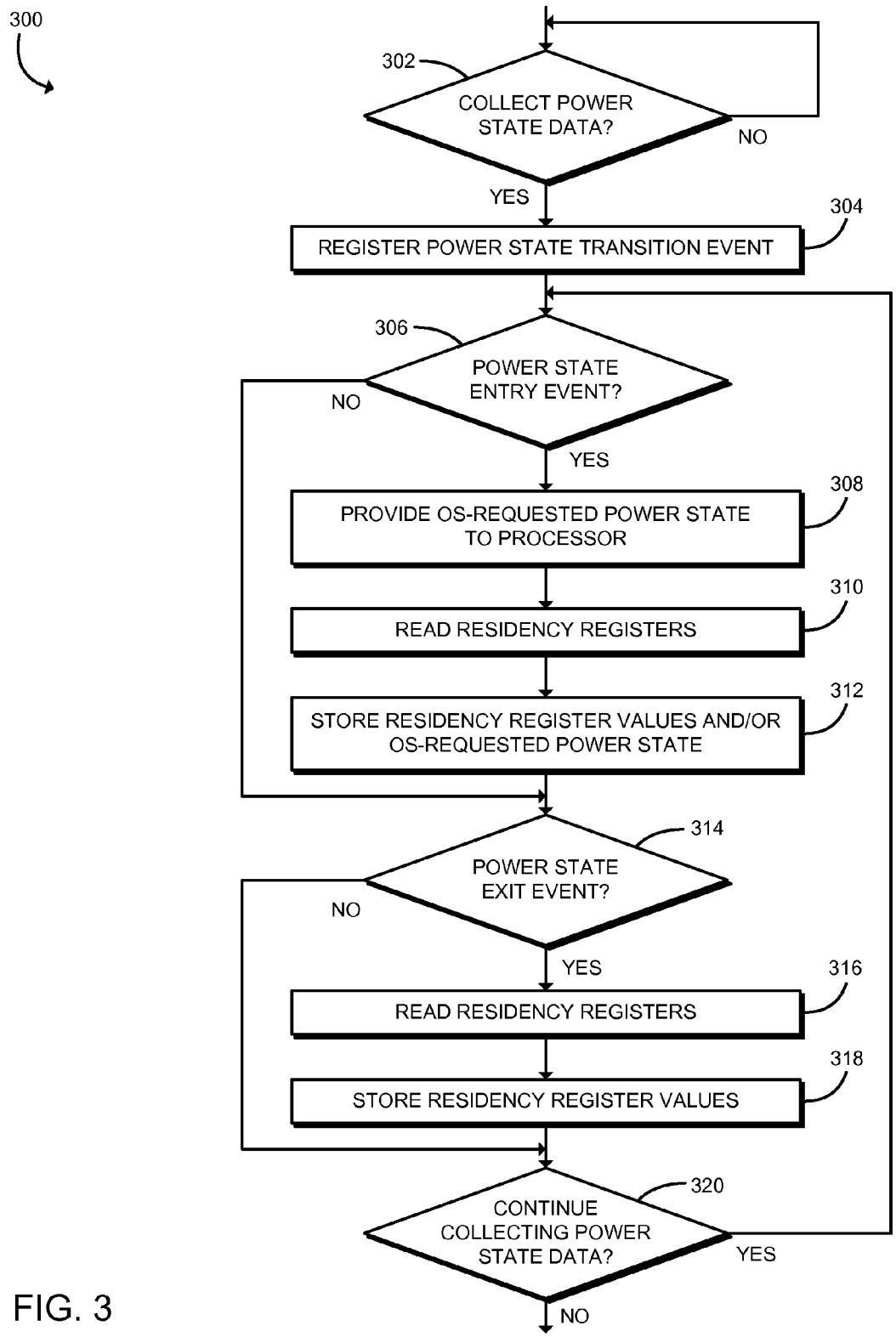
FIG. 3 is a simplified flow diagram of at least one embodiment of a method for collecting power state data by the computing device of FIG. 1.

Referring now to FIG. 3, in use, the computing device 102 may execute a method 300 for collecting power state data 218 for a particular processor 110. The illustrative method 300 begins with block 302 in which the computing device 102 determines whether to collect power state data 218. For example, in an embodiment, the computing device 102 may continuously collect power state data for the processor 110. In another embodiment, the computing device may determine to collect power state data in response to satisfaction of some condition (e.g., a user request, operating system request to monitor the particular processor 110, etc.).

If the computing device 102 determines to collect power state data 218 for the processor 110 (e.g., the primary processor 122), the computing device 102 registers a power state transition event in block 304. That is, as discussed above, the computing device 102 associates an event handler of the processor driver 202 of the computing device 102 with a power state transition (e.g., an entry into a low-power state and/or an exit from a low-power state) such that the event handler is called dynamically in response to each occurrence of the power state transition. It should be appreciated that, in some embodiments, the computing device 102 may have already registered one or more power state transition events or may have pre-registered power state transition events (e.g., as part of the software and/or firmware associated with the processor driver 202). In such embodiments, it may not be necessary to register a power state transition event. Regardless, once a power state transition event has been registered, the computing device 102 may collect power state data 218 by virtue of the associated event handler.

In block 306, the computing device 102 determines whether a power state entry transition event has occurred. If so, the computing device 102 provides an operating system-requested power state to the processor 110 in block 308. Of course, in some embodiments, the operating system may not request that the processor 110 enter a particular power state.

Further, as indicated above, the processor 110 may only enter certain power states autonomously (i.e., without input from the operating system) in some embodiments. As indicated above, in the illustrative embodiment, each of the low-power states of the processor 110 is associated with a particular residency register 216. Accordingly, in block 310, the computing device 102 reads the values of the residency registers 216 of the processor 110. It should be appreciated that, in some embodiments, the computing device 102 may determine that only a subset of the residency registers 216 must be read (e.g., based on other a priori information). In block 312, the computing device 102 stores the residency register 216 values and/or data based on those values as power state data 218. As indicated above, in some embodiments, the computing device 102 may utilize a per processor buffer for doing so. Additionally, in embodiments in which the operating system requested a particular power state, the computing device 102 also stores data indicating the power state requested.

In response to determining in block 306 that a power state entry transition event has not occurred or in response to storing the residency register 216 values in block 312, the computing device 102 determines whether a power state exit transition event has occurred. If so, in block 316, the computing device 102 reads the values of the residency registers 216 and, in block 318, the computing device 102 stores those residency register 216 values. In block 320, the computing device 102 determines whether to continue collecting power state data 218 associated with the processor 110. If so, the method 300 returns to block 306 in which the computing device 102 determines whether a power state entry transition event has occurred.

In other words, in method 300, the computing device 102 registers a power state transition event and corresponding event handler, if necessary, and monitors the occurrences of power state transition events (i.e., low-power state entry events and low-power state exit events). In response to the occurrence of either of those events, the computing device 102 reads the residency registers 216 for the processor 110 and stores that data and/or data derived therefrom as power state data 218. Additionally, in response to a power state entry transition event, the computing device 102 may also provide the processor 110 with a power state requested by the operating system and store data associated with the requested power state.

Figure 4:
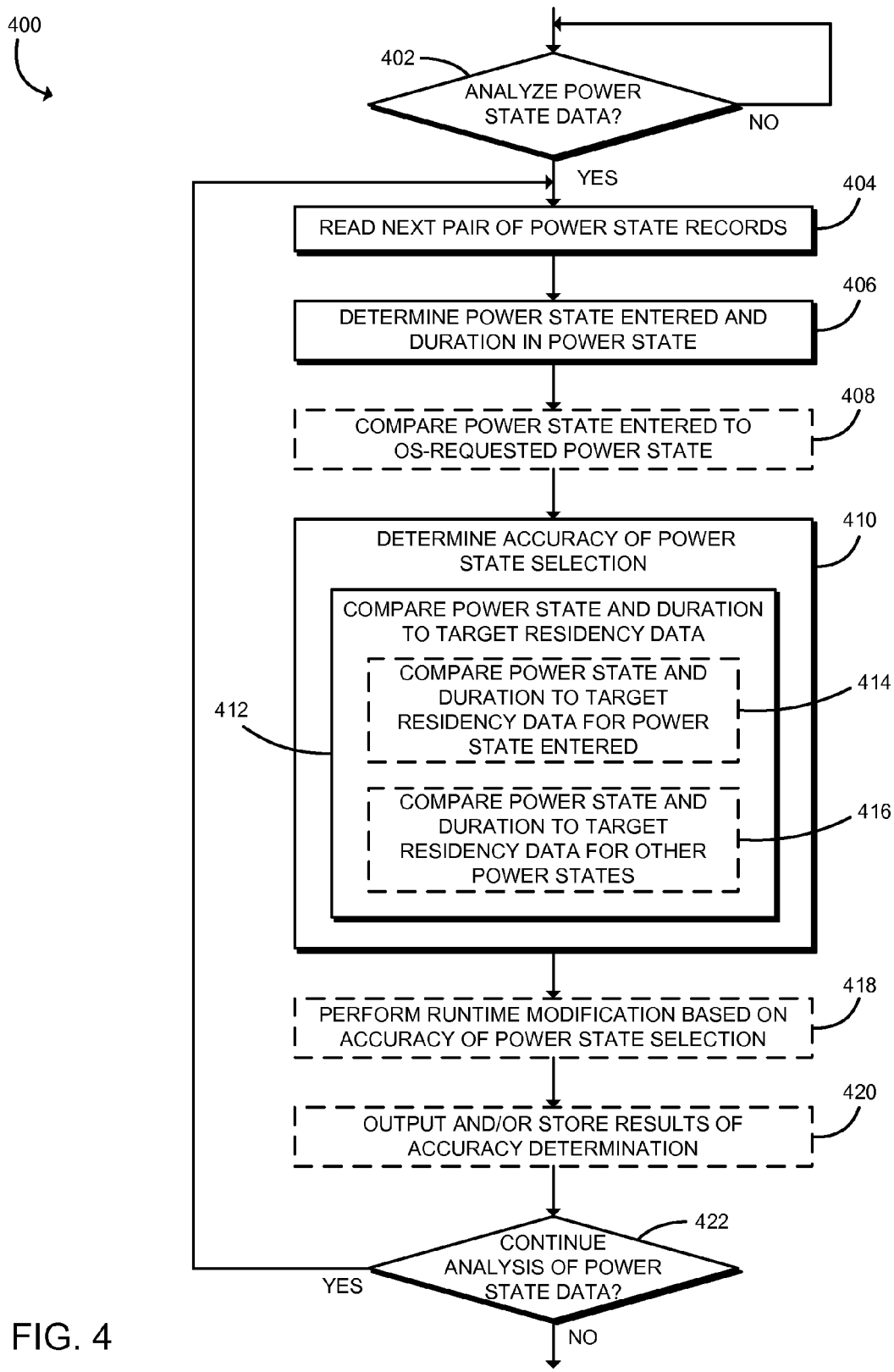
FIG. 4 is a simplified flow diagram of at least one embodiment of a method for analyzing power state data that may be executed by the computing device of FIG. 1.

Referring now to FIG. 4, in use, the computing device 102 may execute a method 400 for analyzing power state data 218 associated with power state transitions of a particular processor 110. It should be appreciated that, in some embodiments, a remote computing device 106 may perform the method 400 for analyzing the power state data 218 of the computing device 102. The illustrative method 400 begins with block 402 in which the computing device 102 determines whether to analyze the power state data 218.

If so, the computing device 102 reads the next pair of power state records in block 404. As described above, the computing device 102 may enter a low-power state from the full-power state and then later exit the low-power state to return to the full-power state. By virtue of the registered power state transition event(s), the computing device 102 is configured to store power state data 218 associated with each of the transitions. Further, the values of the residency registers 216 stored in response to the power state entry transition event and the values of the residency registers 216 stored in response to the subsequent power state exit transition event may be considered as a "pair" of power state records (i.e., those records associated with the low-power state entry and those records associated with the low-power state exit). It should be appreciated that the computing device 102 may utilize any suitable mechanism to determine what constitutes the "next" pair of power state records. For example, in some embodiments, the computing device 102 may analyze the pairs of power state records according to their temporal order.

In block 406, the computing device 102 determines the power state entered by the processor 110 and the duration in the power state. In doing so, the computing device 102 compares the stored residency register 216 values of the processor 110 associated with low-power state entry (i.e., entry values) on a one-to-one basis with the stored residency values associated with the low-power state exit (i.e., exit values) for the pair of power state records. For example, in the illustrative embodiment, an entry value of a first residency register 216 associated with a first low-power state is compared to an exit value of the first residency register 216. Similarly, an entry value of a second residency register 216 associated with a second low-power state is compared to an exit value of the second residency register 216, and so on. As indicated above, a difference between the exit value and the entry value of the residency register 216 for the particular low-power state may be calculated. Because only the residency register 216 associated with the low-power state in which the processor 110 is operating is incremented during operation, only that low-power state has a nonzero difference between exit and entry values. Further, the difference corresponds with the duration of processor 110 in the power state (e.g., clock cycles, temporal duration, etc.).

In block 408, the computing device 102 may compare the power state entered to the power state requested by the operating system of the computing device 102. As discussed above, the processor 110 may deviate from the operating system-requested by state by promoting or demoting the power state based on various factors.

In block 410, the computing device 102 determines the accuracy of the power state selection by the processor 110. That is, the computing device 102 may determine whether entry into the low-power state resulted in conservation of energy and/or whether operation in a different power state would have been more prudent (e.g., to conserve more energy). In doing so, in block 412, the computing device 102 compares the power state and duration of the power state entered to the target residency data 220 associated with the processor 110. As indicated above, the target residency data 220 identifies an amount of time required in a particular power state to result in a conservation of power. It should be appreciated that the amount of time required in the power state may be measured by virtue of a timer, clock cycles, and/or another mechanism.

In block 414, the computing device 102 may compare the power state entered and duration in the power state to the target residency data 220 associated with the power state entered. By doing so, the computing device 102 is able to determine whether entry into the power state resulted in a conservation of power (e.g., relative to an amount of power consumed if full-power had been maintained). That is, if the duration of the processor 110 in the power state exceeds the corresponding target residency data 220 for that power state, the processor 110 conserved energy by transitioning to that power state. Otherwise, the processor 110 wasted energy (e.g., due to the energy required to effect the power state transition and/or associated latency). Further, in block 416, the computing device 102 may compare the power state entered and duration in the power state to target residency data 220 for other power states (i.e., those other than the power state entered). By doing so, the computing device 102 is able to determine whether entry into one of the other power states would have been more suitable to conserve energy (e.g., a deeper or shallower power state) as discussed by example below (see FIG. 5).

In block 418, the computing device 102 may determine to perform a runtime modification based on the determined accuracy of the power state selection as indicated above. For example, the computing device 102 may modify the circumstances in which the operating system requests entry into a particular power state. In block 420, the computing device 102 may output (e.g., to a user or peripheral device) and/or store results of the determined accuracy of the power state selection (e.g., in the data storage 116). In block 422, the computing device 102 determines whether to continue analyzing the power state data 218. If so, the method 400 returns to block 404 in which the computing device 102 reads the next pair of power state records. For example, in an embodiment, the computing device 102 may continue to analyze the power state data 218 until each pair of power state records has been analyzed. It should further be appreciated that, in some embodiments, the collection of the power state data 218 as described in the method 300 may be executed in parallel to the analysis of the power state data 218 as described in the method 400.

Figure 5:
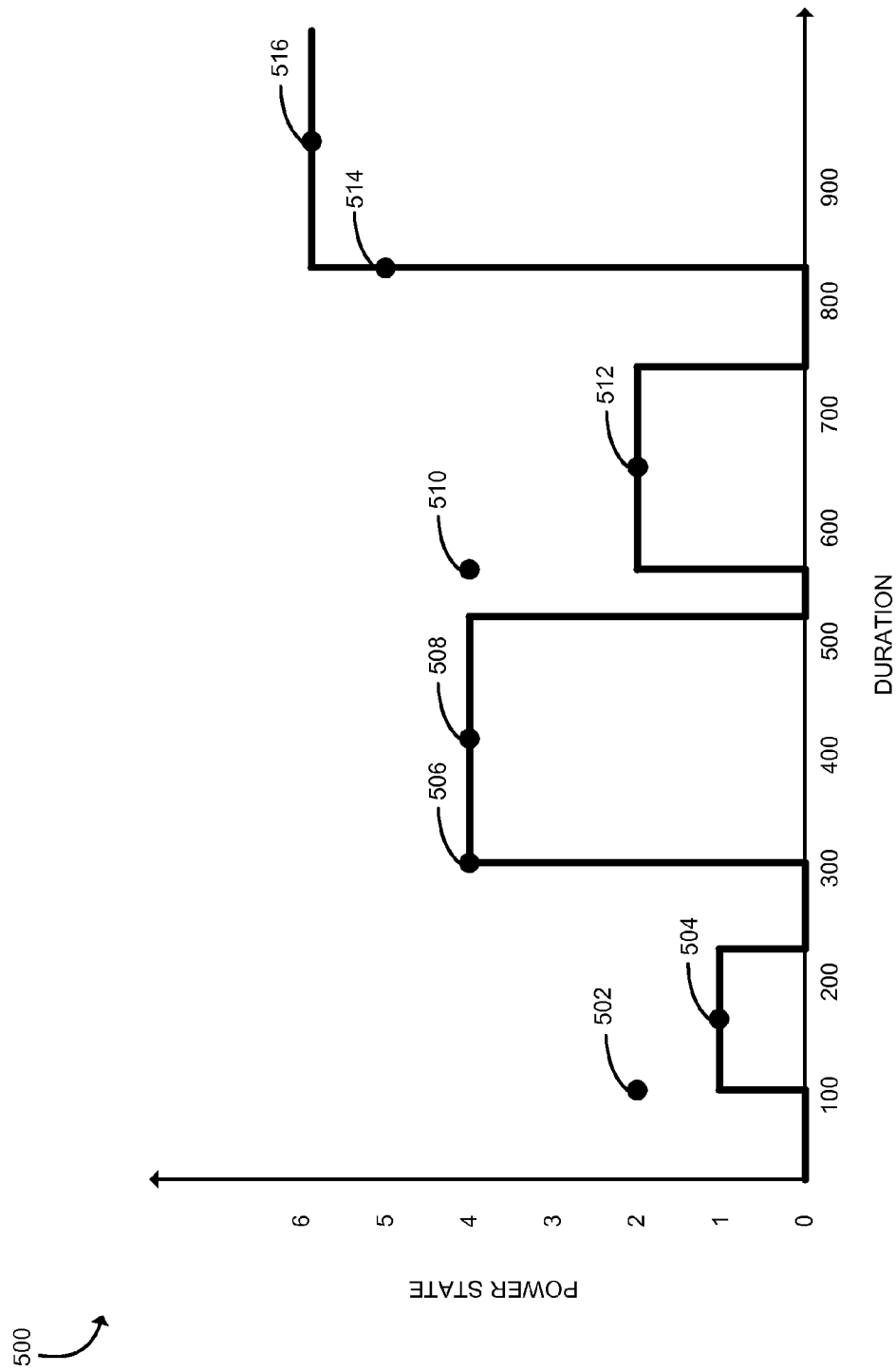
FIG. 5 is a simplified diagram indicative of power state transitions by the processor of the computing device of FIG. 1.

Referring now to FIG. 5, a power state transition diagram 500 is shown. Suppose the duration is measured in terms of clock cycles and the processor 110 begins operation in a full-power state (i.e., C0) at some point in time, which has been arbitrarily defined as zero clock cycles. Although six low-power states are illustratively shown, depending on the particular embodiment, the processor 110 may be configured to enter a greater or lesser number of low-power states as indicated above.

At 100 clock cycles, the processor 110 receives an operating system request 502 to enter the C2 low-power state. However, the processor 110 demotes 504 the request 502 and determines to enter the C1 low-power state. After 125 clock cycles, the processor 110 returns to the C0 full-power state. At 300 clock cycles, the processor 110 receives an operating system request 506 to enter the C4 low-power state with which the processor 110 agrees 508 and enters the C4 low-power state for 225 clock cycles. The processor 110 then returns to the C0 full-power state. At 560 clock cycles, the processor 110 receives an operating system request 510 to enter the C4 low-power state. However, the processor 110 demotes 512 the request 510 and determines to enter the C2 low-power state. After 190 clock cycles, the processor 110 returns to the C0 full-power state. At 825 clock cycles, the processor 110 receives an operating system request 514 to enter the C5 low-power state. However, the processor 110 promotes 516 the request 514 and determines to enter the C6 low-power state.

In the illustrative embodiment, suppose the target residency of the C1 low-power state is 20 clock cycles, the target residency of the C2 low-power state is 100 clock cycles, the target residency of the C3 low-power state is 200 clock cycles, the target residency of the C4 low-power state is 500 clock cycles, the target residency of the C5 low-power state is 1000 clock cycles, and the target residency of the C6 low-power state is 3000 clock cycles. It should further be appreciated that the power state transitions at 100 and 225 clock cycles are associated with a first pair of power state records, the power state transitions at 300 and 525 clock cycles are associated with a second pair of power state records, and the power state transitions at 560 and 750 clock cycles are associated with a third pair of power state records.

As indicated above, each of the first pair, second pair, and third pair of power state records may be analyzed to determine the power state entered, the duration in the power state, and the accuracy of the power state selection. From the diagram 500 and corresponding power state data 218, it is clear that the first pair corresponds with the processor 110 entering the C1 low-power state for 125 clock cycles, the second pair corresponds with the processor 110 entering the C4 low-power state for 225 clock cycles, and the third pair corresponds with the processor 110 entering the C2 low-power state for 190 clock cycles.

In reference to the first pair of power state records, the processor 110 entered the C1 low-power state for 125 clock cycles and the target residency for the C1 low-power state is 20 clock cycles. As such, the processor 110 did conserve energy by entering the C1 low-power state. However, because the target residency for the C2 low-power state (i.e., a deeper power state) is 100 clock cycles, which is less than the 125 clock cycles in which the processor 110 was in a low-power state, the processor 110 could have conserved even more energy by entering the C2 low-power state.

In reference to the second pair of power state records, the processor 110 entered the C4 low-power state for 225 clock cycles and the target residency for the C4 low-power state is 500 clock cycles. Accordingly, the processor 110 did not conserve energy by entering the C4 low-power state; rather, the processor 110 wasted energy by doing so. However, comparing the target residency for the C3 low-power state, which is 200 clock cycles, to the duration in the low-power state (i.e., 225 clock cycles), it is clear that the processor 110 could have conserved the greatest amount of energy by transitioning to the C3 low-power state.

In reference to the third pair of power state records, the processor 110 entered the C2 low-power state for 190 clock cycles and the target residency for the C2 low-power state is 100 clock cycles. Accordingly, the processor 110 conserved energy by entering the C2 low-power state. Further, because the next deepest power state (i.e., C3) has a target residency of 200, which is greater than 190 clock cycles, the processor 110 could not have conserved more energy by transitioning to a different low-power state. Rather, the processor 110 transitioned into the most accurate low-power state. Although the technologies set forth herein have been disclosed with regard to a processor 110 of the computing device 102, it should be appreciated that such technologies may be equally applicable to other components of the computing device 102.

EXAMPLES

Illustrative examples of the technologies disclosed herein are provided below. An embodiment of the technologies may include any one or more, and any combination of, the examples described below.

Example 1 includes a computing device for analyzing power state transitions, the computing device comprising a processor; a data storage having stored thereon (i) power state records comprising transition data indicative of transitions of the processor between power states and (ii) target residency data that identifies, for each power state of a plurality of power states of the processor, an amount of time required in the corresponding power state to result in a conservation of power; and a power state analysis module to (i) determine a power state entered by the processor and a duration of the power state entered based on the power state records and (ii) determine an accuracy of a power state selection of the processor based on the determined power state entered and the target residency data for the processor.

Example 2 includes the subject matter of Example 1, and wherein the target residency data identifies the amount of time required in the corresponding power state to result in a conservation of power relative to an amount of power consumed by the processor without transitioning to the power state entered.

Example 3 includes the subject matter of any of Examples 1 and 2, and wherein to determine the accuracy of the power state selection comprises to determine whether the duration in the power state entered exceeds an amount of time required in the power state entered to result in a conservation of power.

Example 4 includes the subject matter of any of Examples 1-3, and wherein to determine the accuracy of the power state selection comprises to determine whether the duration in the power state entered exceeds a duration of time required in another power state of the plurality of power states, wherein the processor consumes less power in the another power state than in the power state entered.

Example 5 includes the subject matter of any of Examples 1-4, and wherein the transition data comprises a first residency register value indicative of an entry into the power state entered and a second residency register value indicative of an exit from the power state entered.

Example 6 includes the subject matter of any of Examples 1-5, and wherein the first residency register value corresponds with a first value of a residency register of the processor at a point in time at which the processor enters a particular power state; and the second residency register value corresponds with a second value of the residency register at a point in time at which the processor exits the particular power state; and the residency register is incremented each clock cycle of the processor.

Example 7 includes the subject matter of any of Examples 1-6, and wherein the transition data comprises residency register values for each power state of the plurality of power states at a point in time at which the processor entered the power state entered and at a point in time at which the processor exited the power state entered; and wherein the residency register value for an associated power state is incremented for each clock cycle of the processor during which the processor is in the associated power state.

Example 8 includes the subject matter of any of Examples 1-7, and wherein to determine the power state entered comprises to determine, for each power state of the plurality of power states, a difference between a residency register value at the point in time at which the processor exited the power state entered and a residency register value at the point in time at which the processor entered the power state entered, the difference being nonzero and corresponding with the duration of the processor in the power state entered.

Example 9 includes the subject matter of any of Examples 1-8, and wherein the power state analysis module is further to determine a power state requested by an operating system of the computing device; and compare the power state entered to the power state requested.

Example 10 includes the subject matter of any of Examples 1-9, and wherein the power state analysis module is further to perform a runtime modification of an operating system of the computing device based on the determined accuracy of the power state selection.

Example 11 includes the subject matter of any of Examples 1-10, and wherein the processor of the computing device comprises a processor of the computing device other than a central processing unit of the computing device.

Example 12 includes the subject matter of any of Examples 1-11, and further including a power state transition event module to register a power state transition event to call an event handler in response to a transition of the processor between power states.

Example 13 includes the subject matter of any of Examples 1-12, and further including a power state transition event module to read residency registers of the processor for each power state of the plurality of power states in response to determining the processor has entered a low-power state; and store entry values of the residency registers read by the computing device in a memory, wherein a particular residency register is incremented for each clock cycle of the processor during which the processor is in a power state corresponding with the particular residency register.

Example 14 includes the subject matter of any of Examples 1-13, and further including a power state request module to provide a power state requested by an operating system of the computing device to the processor.

Example 15 includes the subject matter of any of Examples 1-14, and further including a power state transition event module to read the residency registers for each power state in response to determining the processor has exited the low-power state; and store exit values of the residency registers read by the first computing device in a memory.

Example 16 includes the subject matter of any of Examples 1-15, and further including a communication module to transmit the power state data to a remote computing device for analysis of the accuracy of the power state selection.

Example 17 includes a method for analyzing power state transitions of a processor of computing device, the method comprising determining, by the computing device, a power state entered by the processor of the computing device and a duration of the power state entered based on power state records, wherein the power state records comprise transition data indicative of transitions of a processor of the computing device between power states; and determining, by the computing device, an accuracy of a power state selection of the processor of the computing device based on the determined power state entered and target residency data for the processor, wherein the target residency data identifies, for each power state of a plurality of power states of the processor, an amount of time required in the corresponding power state to result in a conservation of power.

Example 18 includes the subject matter of Example 17, and wherein the target residency data identifies the amount of time required in the corresponding power state to result in a conservation of power relative to an amount of power consumed by the processor without transitioning to the power state entered.

Example 19 includes the subject matter of any of Examples 17 and 18, and wherein determining the accuracy of the power state selection comprises determining whether the duration in the power state entered exceeds an amount of time required in the power state entered to result in a conservation of power.

Example 20 includes the subject matter of any of Examples 17-19, and wherein determining the accuracy of the power state selection comprises determining whether the duration in the power state entered exceeds a duration of time required in another power state of the plurality of power states, wherein the processor consumes less power in the another power state than in the power state entered.

Example 21 includes the subject matter of any of Examples 17-20, and wherein the transition data comprises a first residency register value indicative of an entry into the power state entered and a second residency register value indicative of an exit from the power state entered.

Example 22 includes the subject matter of any of Examples 17-21, and wherein the first residency register value corresponds with a first value of a residency register of the processor at a point in time at which the processor enters a particular power state; and the second residency register value corresponds with a second value of the residency register at a point in time at which the processor exits the particular power state; and the residency register is incremented each clock cycle of the processor.

Example 23 includes the subject matter of any of Examples 17-22, and wherein determining the power state entered comprises determining, for each power state of the plurality of power states, a difference between a residency register value at the point in time at which the processor exited the power state entered and a residency register value at the point in time at which the processor entered the power state entered, the difference being nonzero and corresponding with the duration of the processor in the power state entered.

Example 24 includes the subject matter of any of Examples 17-23, and wherein the transition data comprises residency register values for each power state of the plurality of power states at a point in time at which the processor entered the power state entered and at a point in time at which the processor exited the power state entered; and wherein the residency register value for an associated power state is incremented for each clock cycle of the processor during which the processor is in the associated power state.

Example 25 includes the subject matter of any of Examples 17-24, and further including determining, by the computing device, a power state requested by an operating system of the computing device; and comparing, by the computing device, the power state entered to the power state requested.

Example 26 includes the subject matter of any of Examples 17-25, and further including performing, by the computing device, a runtime modification of an operating system of the computing device based on the determined accuracy of the power state selection.

Example 27 includes the subject matter of any of Examples 17-26, and wherein the processor of the computing device comprises a processor of the computing device other than a central processing unit of the computing device.

Example 28 includes the subject matter of any of Examples 17-27, and further including registering, by the computing device, a power state transition event to call an event handler in response to a transition of the processor between power states.

Example 29 includes the subject matter of any of Examples 17-28, and further including reading, by the computing device, residency registers of the processor for each power state of the plurality of power states in response to determining the processor has entered a low-power state; and storing, by the computing device, entry values of the residency registers read by the computing device in a memory, wherein a particular residency register is incremented for each clock cycle of the processor during which the processor is in a power state corresponding with the particular residency register.

Example 30 includes the subject matter of any of Examples 17-29, and further including providing, by an operating system of the computing device and to the processor, a power state requested by the operating system.

Example 31 includes the subject matter of any of Examples 17-30, and further including reading, by the computing device, the residency registers for each power state in response to determining the processor has exited the low-power state; and storing, by the computing device, exit values of the residency registers read by the first computing device in a memory.

Example 32 includes the subject matter of any of Examples 17-31, and further including transmitting, by the computing device, the power state data to a remote computing device for analysis of the accuracy of the power state selection.

Example 33 includes a computing device comprising a processor; and a memory having stored therein a plurality of instructions that when executed by the processor cause the computing device to perform the method of any of Examples 17-32.

Examples 34 includes one or more machine-readable storage media comprising a plurality of instructions stored thereon that, in response to being executed, result in a computing device performing the method of any of Examples 17-32.

Examples 35 includes a computing device for analyzing power state transitions, the computing device comprising means for determining a power state entered by the processor of the computing device and a duration of the power state entered based on power state records, wherein the power state records comprise transition data indicative of transitions of a processor of the computing device between power states; and means for determining an accuracy of a power state selection of the processor of the computing device based on the determined power state entered and target residency data for the processor, wherein the target residency data identifies, for each power state of a plurality of power states of the processor, an amount of time required in the corresponding power state to result in a conservation of power.

Example 36 includes the subject matter of Example 35, and wherein the target residency data identifies the amount of time required in the corresponding power state to result in a conservation of power relative to an amount of power consumed by the processor without transitioning to the power state entered.

Example 37 includes the subject matter of any of Examples 35 and 36, and wherein the means for determining the accuracy of the power state selection comprises means for determining whether the duration in the power state entered exceeds an amount of time required in the power state entered to result in a conservation of power.

Example 38 includes the subject matter of any of Examples 35-37, and wherein the means for determining the accuracy of the power state selection comprises means for determining whether the duration in the power state entered exceeds a duration of time required in another power state of the plurality of power states, wherein the processor consumes less power in the another power state than in the power state entered.

Example 39 includes the subject matter of any of Examples 35-38, and wherein the transition data comprises a first residency register value indicative of an entry into the power state entered and a second residency register value indicative of an exit from the power state entered.

Example 40 includes the subject matter of any of Examples 35-39, and wherein the first residency register value corresponds with a first value of a residency register of the processor at a point in time at which the processor enters a particular power state; and the second residency register value corresponds with a second value of the residency register at a point in time at which the processor exits the particular power state; and the residency register is incremented each clock cycle of the processor.

Example 41 includes the subject matter of any of Examples 35-40, and wherein the means for determining the power state entered comprises means for determining, for each power state of the plurality of power states, a difference between a residency register value at the point in time at which the processor exited the power state entered and a residency register value at the point in time at which the processor entered the power state entered, the difference being nonzero and corresponding with the duration of the processor in the power state entered.

Example 42 includes the subject matter of any of Examples 35-41, and wherein the transition data comprises residency register values for each power state of the plurality of power states at a point in time at which the processor entered the power state entered and at a point in time at which the processor exited the power state entered; and wherein the residency register value for an associated power state is incremented for each clock cycle of the processor during which the processor is in the associated power state.

Example 43 includes the subject matter of any of Examples 35-42, and further including means for determining a power state requested by an operating system of the computing device; and means for comparing the power state entered to the power state requested.

Example 44 includes the subject matter of any of Examples 35-43, and further including means for performing a runtime modification of an operating system of the computing device based on the determined accuracy of the power state selection.

Example 45 includes the subject matter of any of Examples 35-44, and wherein the processor of the computing device comprises a processor of the computing device other than a central processing unit of the computing device.

Example 46 includes the subject matter of any of Examples 35-45, and further including means for registering a power state transition event to call an event handler in response to a transition of the processor between power states.

Example 47 includes the subject matter of any of Examples 35-46, and further comprising means for reading residency registers of the processor for each power state of the plurality of power states in response to determining the processor has entered a low-power state; and means for storing entry values of the residency registers read by the computing device in a memory, wherein a particular residency register is incremented for each clock cycle of the processor during which the processor is in a power state corresponding with the particular residency register.

Example 48 includes the subject matter of any of Examples 35-47, and further including means for providing, by an operating system of the computing device and to the processor, a power state requested by the operating system.

Example 49 includes the subject matter of any of Examples 35-48, and further including means for reading the residency registers for each power state in response to determining the processor has exited the low-power state; and means for storing exit values of the residency registers read by the first computing device in a memory.

Example 50 includes the subject matter of any of Examples 35-49, and further including means for transmitting the power state data to a remote computing device for analysis of the accuracy of the power state selection.

The invention claimed is:

1. A computing device for analyzing power state transitions, the computing device comprising:
a processor;
a data storage having stored thereon (i) power state records comprising transition data indicative of transitions of the processor between power states and (ii) target residency data that identifies, for each power state of a plurality of power states of the processor, an amount of time required in the corresponding power state to result in a conservation of power; and
a power state analysis module to (i) determine a power state entered by the processor and a duration of the power state entered based on the power state records and (ii) determine, based on the determined power state entered and the target residency data for the processor, whether the duration in the power state entered exceeds a duration of time required in another power state of the plurality of power states to result in a conservation of power to determine an accuracy of a power state selection of the processor, wherein the processor consumes less power in the another power state than in the power state entered.

2. The computing device of claim 1, wherein the target residency data identifies the amount of time required in the corresponding power state to result in a conservation of power relative to an amount of power consumed by the processor without transitioning to the power state entered.

3. The computing device of claim 1, wherein to determine the accuracy of the power state selection comprises to determine whether the duration in the power state entered exceeds an amount of time required in the power state entered to result in a conservation of power.

4. The computing device of claim 1, wherein the transition data comprises a first residency register value indicative of an entry into the power state entered and a second residency register value indicative of an exit from the power state entered.

5. The computing device of claim 4, wherein:
the first residency register value corresponds with a first value of a residency register of the processor at a point in time at which the processor enters a particular power state; and
the second residency register value corresponds with a second value of the residency register at a point in time at which the processor exits the particular power state; and
the residency register is incremented each clock cycle of the processor.

6. The computing device of claim 4, wherein to determine the power state entered comprises to determine, for each power state of the plurality of power states, a difference between a residency register value at the point in time at which the processor exited the power state entered and a residency register value at the point in time at which the processor entered the power state entered, the difference being nonzero and corresponding with the duration of the processor in the power state entered.

7. The computing device of claim 1, wherein the transition data comprises residency register values for each power state of the plurality of power states at a point in time at which the processor entered the power state and at a point in time at which the processor exited the power state entered; and
wherein the residency register value for an associated power state is incremented for each clock cycle of the processor during which the processor is in the associated power state.

8. The computing device of claim 1, wherein the power state analysis module is further to:
determine a power state requested by an operating system of the computing device; and
compare the power state entered to the power state requested.

9. The computing device of claim 1, wherein the power state analysis module is further to perform a runtime modification of an operating system of the computing device based on the determined accuracy of the power state selection.

10. The computing device of claim 1, wherein the processor of the computing device comprises a processor of the computing device other than a central processing unit of the computing device.

11. The computing device of claim 1, further comprising a power state transition event module to register a power state transition event to call an event handler in response to a transition of the processor between power states.

12. The computing device of claim 1, further comprising a power state transition event module to:
  read residency registers of the processor for each power state of the plurality of power states in response to determining the processor has entered a low-power state;
  store entry values of the residency registers read by the computing device in a memory;
  read the residency registers for each power state in response to determining the processor has exited the low-power state; and
  store exit values of the residency registers read by the first computing device in a memory,
  wherein a particular residency register is incremented for each clock cycle of the processor during which the processor is in a power state corresponding with the particular residency register.

13. One or more machine-readable storage media comprising a plurality of instructions stored thereon that, in response to execution by a computing device, cause the computing device to:
  determine a power state entered by the processor of the computing device and a duration of the power state entered based on power state records, wherein the power state records comprise transition data indicative of transitions of a processor of the computing device between power states; and
  determine, based on the determined power state entered and target residency data for the processor, whether the duration in the power state entered exceeds a duration of time required in another power state of the plurality of power states to result in a conversation of power to determine an accuracy of a power state selection of the processor of the computing device,
  wherein the processor consumes less power in the another power state than in the power state entered, and
  wherein the target residency data identifies, for each power state of a plurality of power states of the processor, an amount of time required in the corresponding power state to result in a conservation of power.

14. The one or more machine-readable storage media of claim 13, wherein the target residency data identifies the amount of time required in the corresponding power state to result in a conservation of power relative to an amount of power consumed by the processor without transitioning to the power state entered.

15. The one or more machine-readable storage media of claim 13, wherein to determine the accuracy of the power state selection comprises to determine whether the duration in the power state entered exceeds an amount of time required in the power state entered to result in a conservation of power.

16. The one or more machine-readable storage media of claim 13, wherein the transition data comprises a first residency register value indicative of an entry into the power state entered and a second residency register value indicative of an exit from the power state entered.

17. The one or more machine-readable storage media of claim 16, wherein:
  the first residency register value corresponds with a first value of a residency register of the processor at a point in time at which the processor enters a particular power state; and
  the second residency register value corresponds with a second value of the residency register at a point in time at which the processor exits the particular power state; and
  the residency register is incremented each clock cycle of the processor.

18. The one or more machine-readable storage media of claim 16, wherein to determine the power state entered comprises to determine, for each power state of the plurality of power states, a difference between a residency register value at the point in time at which the processor exited the power state entered and a residency register value at the point in time at which the processor entered the power state entered, the difference being nonzero and corresponding with the duration of the processor in the power state entered.

19. The one or more machine-readable storage media of claim 13, wherein the plurality of instructions further cause the computing device to:
  read residency registers of the processor for each power state of the plurality of power states in response to determining the processor has entered a low-power state;
  store entry values of the residency registers read by the computing device in a memory;
  read the residency registers for each power state in response to determining the processor has exited the low-power state; and
  store exit values of the residency registers read by the first computing device in a memory,
  wherein a particular residency register is incremented for each clock cycle of the processor during which the processor is in a power state corresponding with the particular residency register.

20. A method for analyzing power state transitions of a processor of computing device, the method comprising:
  determining, by the computing device, a power state entered by the processor of the computing device and a duration of the power state entered based on power state records, wherein the power state records comprise transition data indicative of transitions of a processor of the computing device between power states; and
  determining, by the computing device, based on the determined power state entered and target residency data for the processor, whether the duration in the power state entered exceeds a duration of time required in another power state of the plurality of power states to result in a conversation of power to determine an accuracy of a power state selection of the processor,
  wherein the processor consumes less power in the another power state than in the power state entered, and
  wherein the target residency data identifies, for each power state of a plurality of power states of the processor, an amount of time required in the corresponding power state to result in a conservation of power.

21. The method of claim 20, wherein the target residency data identifies the amount of time required in the corresponding power state to result in a conservation of power relative to an amount of power consumed by the processor without transitioning to the power state entered.

22. The method of claim 20, wherein determining the accuracy of the power state selection comprises determining whether the duration in the power state entered exceeds an amount of time required in the power state entered to result in a conservation of power.

* * * * *